May 4, 1926.

F. H. JACOBS

AEROPLANE

Filed June 27, 1925     3 Sheets-Sheet 1

1,583,155

INVENTOR.
F. H. Jacobs.
BY
ATTORNEY.

May 4, 1926.  F. H. JACOBS  1,583,155
AEROPLANE
Filed June 27, 1925   3 Sheets-Sheet 2

INVENTOR.
F. H. Jacobs.
BY
ATTORNEY.

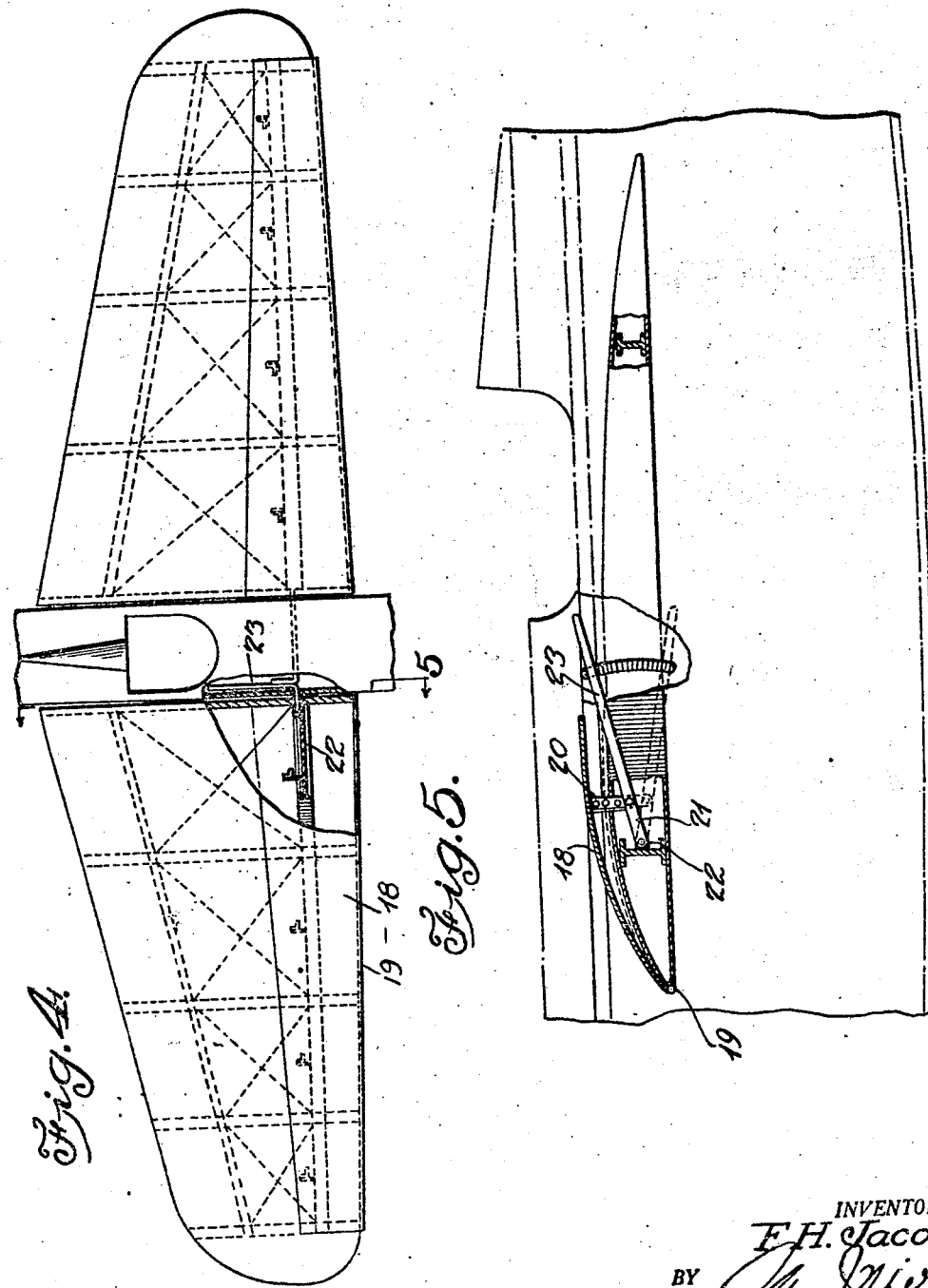

Patented May 4, 1926.

1,583,155

UNITED STATES PATENT OFFICE.

FRANK H. JACOBS, OF PUYALLUP, WASHINGTON.

AEROPLANE.

Application filed June 27, 1925. Serial No. 40,007.

*To all whom it may concern:*

Be it known that I, FRANK H. JACOBS, a citizen of the United States of America, residing at Puyallup, in the county of Pierce and State of Washington, have invented certain new and useful Improvements in Aeroplanes, of which the following is a specification.

This invention relates to an improvement in aeroplanes, and particularly to means whereby the wings or weight sustaining planes are mounted for pivotal movement with respect to the fuselage and movable at the will of the operator to vary the angle of incidence of the planes in accordance with the particular flying needs; the invention also including a wing flap which is pivotally mounted at the leading edge of the wing or plane and adjustable about such leading edge with relation to the plane to thereby vary the lifting capacity of the aeroplane by varying the partial vacuum above the upper wing surface to thereby vary the suction or lift.

The invention is illustrated in the accompanying drawings; in which:

Fig. 4 is a partial plan showing the wings provided with the wing flaps of the present improvement.

Fig. 5 is a section on line 5—5 of Fig. 4.

Figure 1:
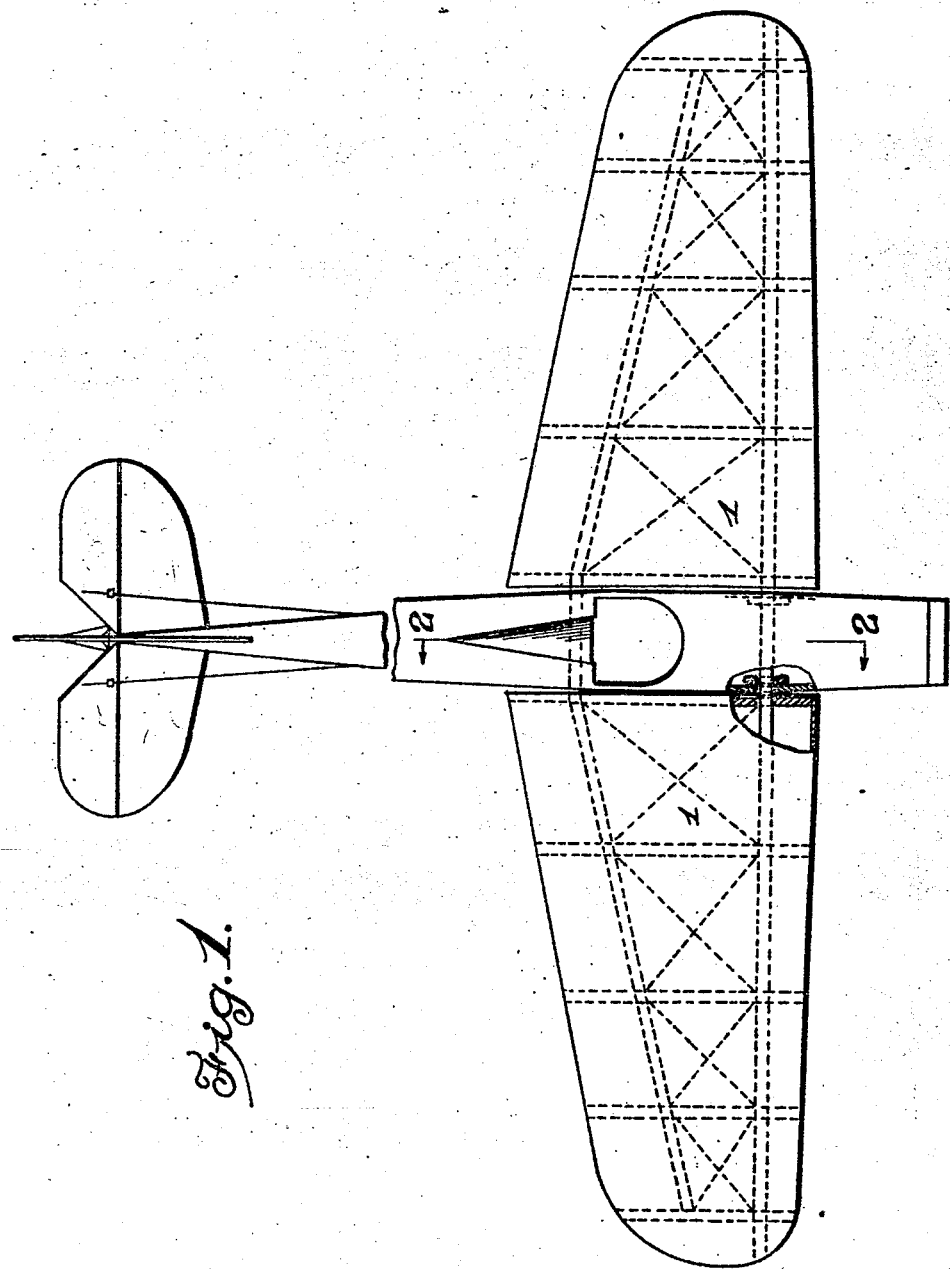
Fig. 1 is a plan view illustrating an aeroplane provided with the improved means for varying the angle of incidence of the wings.
Figure 2:
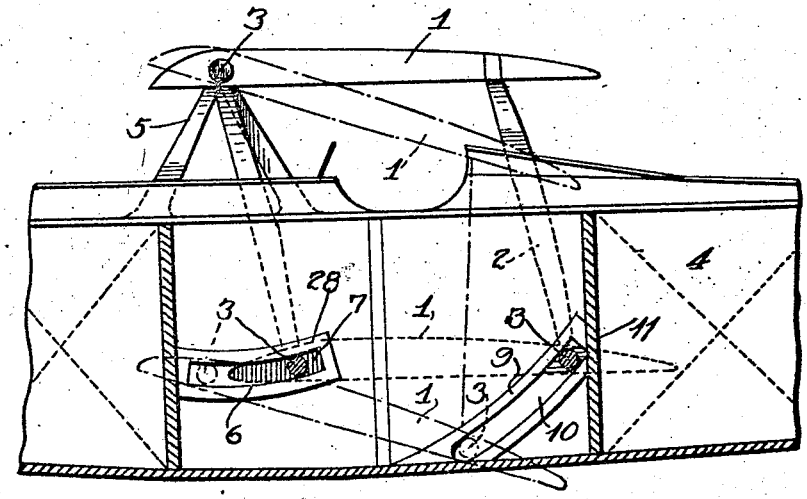
Fig. 2 is a broken vertical sectional view on the line 2—2 of Fig. 1.

In Figs. 1 and 2, wherein is illustrated the adjustable wing construction, the invention is shown as applied to a biplane, in which the weight sustaining planes or wings 1 are of any usual or preferred construction, and connected by the usual struts 2, rigidly connected to and serving to brace the respective pairs of wings in the usual manner. The spars or frame bars 3 of the wings of the upper set extend in the usual manner from the tip of the wing longitudinally thereof, such spars for the purpose of the present invention being extended across and through the fuselage 4 as relatively rigid connected members. That is to say, the respective spars of both sets of wings extend throughout from the tip of one wing on one side to the tip of the similar wing on the opposite side, said spars being extended as a single member or having their ends within the fuselage rigidly connected together in any approved manner. Thus with the vertical struts or braces rigidly connected to the respective wings on one side and the wing spars of the upper wings and lower wings respectively connected together, such wings constitute a comparatively rigid structure, so that movement of any one wing compels a similar and uniform movement of all other wings.

The forward spar 3 of the upper set of wings is pivotally supported in a bracket 5, rigidly secured to and arising from the fuselage in a manner to support this spar in its proper position above the fuselage and for rotative or wing pivoting movement. The forward spar 3 of the lower wings is mounted in guides 6 in the side walls of the fuselage, which guides are formed with slots 7, having an arcuate form corresponding to the movement of the spar, and said spar is preferably mounted in thrust blocks 8 having guiding cooperation with the walls of the slots 7. The rear spar 3 of the lower wings is, in its passage through the fuselage, also mounted in guides 9 having slots 10 shaped to correspond with the movement of the spars; the spars being mounted in thrust blocks 11 having sliding cooperation with the walls of the slots. Pivotally mounted within the fuselage is a quadrant 12 having its arcuate edge formed as a rack bar 13 to be engaged by a pinion 14 carried on the shaft of a hand wheel 15, whereby through the operation of the hand wheel, the quadrant may be moved to any position about its center of rotation. Secured upon the quadrant shaft or connected to the quadrant is an arm 16, the terminal of which is connected to a link 17, which in turn is pivotally connected to the thrust blocks 11 of the rear spars 3 of the lower wings. Obviously, by turning the hand wheel 15, the thrust blocks 11 and therefore the rear spars 3 of the lower wings may be moved at will, and as all wings constitute a relatively rigid construction, it is apparent that all wings will be simultaneously and similarly moved.

Figure 3:
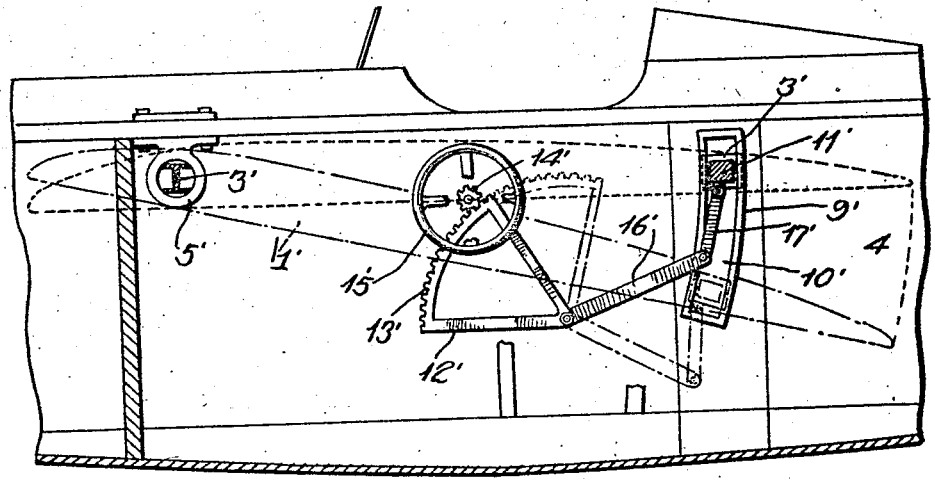
Fig. 3 is a view similar to Fig. 2, showing the invention applied to a monoplane.

In Fig. 3, the invention is shown as applied to a monoplane, in which the wings 1' have their forward spars 3' pivotally mounted in bearing blocks 5" secured in the walls of a fuselage 4', it being understood that the spars 3' of the wings are extended from tip to tip of the respective wings as in the form previously described. The rear spars 3' of the wings are guided in plates 9' secured in the fuselage, having slots 10' to guidingly receive thrust blocks 11' carrying the spars. These rear spars 3' are operated in a manner described in connection with the preferred form, that is, through the provision of a quadrant 12' having a rack edge 13' engaged by a pinion 14' on the shaft of a hand wheel 15'. The quadrant has an arm 16' connected by a link 17' with the thrust blocks 11'.

In either form of the device, it is apparent that the operator may change the angle of incidence of the wings at will, increasing this angle in order to secure a greater lifting power to permit, for example, the machine landing or leaving the ground at a speed lower than ordinarily necessary, and therefore safer, or to permit the machine to carry and support a greater load. When flying, the angle of incidence can be reduced to the minimum to avoid head resistance and therefore permit a greater flying speed.

In Figs. 4 and 5, I have shown a construction including a wing flap, which is adjustable at the will of the operator to vary the vacuum effect on the upper surface of the wing, to thereby vary the lifting power of the aeroplane at will. The wing flap 18, which extends substantially one-third the horizontal dimension of the wing longitudinally of the fuselage, and substantially from the inner edge of the wing to the point adjacent the tip, is formed of material similar to the wing and is suitably braced to provide a substantially rigid structure. The flap is pivotally or movably supported at the leading edge of the wing as at 19, and in rear of such edge is provided with fixed depending arms 20, which are adapted for adjustable connection with arms 21 projecting from a shaft 22 rotatably supported longitudinally of the wing, preferably in bearings carried by the forward wing spar. The end of the shaft 22 projects within the fuselage and is there connected with a hand lever 23 adapted for locking engagement through the usual dog and segment 24 with a sector 25. The construction permits the operator through manipulation of the hand lever 23 to swing the flap about its pivotal support 19 to raise said flap relative to the wing surface and thereby in effect increase the thickness of the forward portion of the wing. This tends to an increase of suction on the upper surface of the wing, and obviously increases the lifting power of the wing.

The wings are designed to be provided with the flaps described, and through an obvious mechanical expedient, not necessary to be illustrated or specifically described, the hand lever 23 may be adapted to simultaneously control all flaps, or if desired, each flap may be independently controlled, the invention contemplating either or both arrangements.

As understood, the lifting power of an aeroplane wing is resultant in part by the pressure of the air on the underneath surface of the wing, to the extent of substantially one-third of the total lift, and in part to the suction above the wing surface to the extent of substantially two-thirds of the lifting power. As the wing flap lies flat on the top of the upper wing surface in normal position, the lifting power of the aeroplane is that of the designed wing, but with the flap adjusted so that its rear free edge is raised above the surface of the wing, the thickness of the wing throughout the area of the flap is increased, correspondingly increasing the partial vacuum above the upper wing surface, with the result to create a greater suction or lift. The control of the lifting power being thus in a measure within the judgment of the operator, it is apparent that the take-off may be used with less speed; the wings may be of thinner construction than heretofore possible, and the fixed angle of incidence of the wings may be less than that usually required. These results directly flow from the use of the flap described, as in the use of such flap, the lifting power of the aeroplane may be governed in accordance with conditions, while in flight with the flap in normal position, less head resistance is encountered and the flying speed per unit of horse power is necessarily greater.

Claims:

1. In a biplane, means for pivotally supporting the leading edge of the upper wing, a forward strut connecting the upper and lower wing, means for guiding the connection of the strut and lower wing at the leading edge of the latter to permit a predetermined swinging movement of such point, a rear strut connecting the upper and lower wings, means for guiding the point of the pivotal connection between said strut and lower wing to compel a predetermined movement of such point, and means connected to the lower wing for compelling and limiting movement of both wings.

2. In a biplane, means for pivotally supporting the leading edge of the upper wing, a forward strut connecting the upper and lower wings, means for guiding the connection of the strut and lower wing at the leading edge of the latter to permit a predetermined swinging movement of such point in a substantially horizontal plane, a rear strut connecting the upper and lower wings, means for guiding the point of the pivotal connection between said strut and lower wing to compel a predetermined movement of such point in a plane inclined to the horizontal, and means connected to the lower wing for compelling and limiting movement of both wings.

3. An aeroplane wing, a flap pivotally connected to the leading edge thereof, a shaft rotatably supported on one of the transverse spars of the wing, arms depending from the flap rearwardly of the pivotal edge, and links projecting from the shaft and connected to said arms, and an operating lever secured to one end of the shaft.

4. An aeroplane wing, a flap pivotally connected to the leading edge thereof, a shaft rotatably supported on one of the transverse spars of the wing, arms depending from the flap rearwardly of the pivotal edge, and links projecting from the shaft and adjustably connected to said arms, and an operating lever secured to one end of the shaft.

In testimony whereof I affix my signature.

FRANK H. JACOBS. [L. S.]